(12) United States Patent
Ayyagari

(10) Patent No.: US 7,506,042 B2
(45) Date of Patent: Mar. 17, 2009

(54) HIERARCHICAL AD HOC NETWORK ORGANIZATIONAL METHOD INVOLVING WITH PROXY NETWORKING

(75) Inventor: Deepak V. Ayyagari, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 766 days.

(21) Appl. No.: 10/913,657

(22) Filed: Aug. 6, 2004

(65) Prior Publication Data

US 2006/0031477 A1    Feb. 9, 2006

(51) Int. Cl.
G06F 15/173 (2006.01)
(52) U.S. Cl. ........................................ 709/223
(58) Field of Classification Search ............... 709/223
See application file for complete search history.

(56) References Cited

U.S. PATENT DOCUMENTS

| 6,483,812 | B1 | 11/2002 | Prorock |
| 7,200,149 | B1 * | 4/2007 | Hasty, Jr. ............ 370/400 |
| 2001/0029166 | A1 | 10/2001 | Rune et al. |
| 2002/0044533 | A1 * | 4/2002 | Bahl et al. ............ 370/255 |
| 2002/0131363 | A1 * | 9/2002 | Beshai et al. ......... 370/230 |
| 2004/0018839 | A1 * | 1/2004 | Andric et al. ......... 455/433 |
| 2005/0180356 | A1 * | 8/2005 | Gillies et al. ......... 370/329 |

FOREIGN PATENT DOCUMENTS

| EP | 1 107 522 A1 | 6/2001 |
| WO | WO 02/087182 A1 | 10/2002 |

OTHER PUBLICATIONS

IEEE 802. 15. 3 Standard—(extract).

* cited by examiner

*Primary Examiner*—Jeffrey Pwu
*Assistant Examiner*—Abdelnabi O Musa
(74) *Attorney, Agent, or Firm*—David C. Ripma; Jon M. Dickinson; Robert D. Varitz

(57) ABSTRACT

An ad hoc network organizational method which is employable with a collection of plural nodes in a setting where there is available a current overall network topology map containing at least the identities of, and the inter-nodal communication link qualities and capabilities associated with, each of the nodes. The method generally involves the steps of (a) examining the topology map to determine the current pattern of possible and not-possible direct communication links between pairs of nodes, thus to detect, from an inter-nodal, inter-communication point of view, hidden nodes and non-hidden nodes, and (b) on the basis of such examining, establishing a proxy networking scheme wherein pairs of nodes which are hidden with respect to one another can nonetheless communicate with one another through at least one, intermediary, selectable proxy node which is non-hidden with respect to each of the two nodes in such a pair.

1 Claim, 2 Drawing Sheets

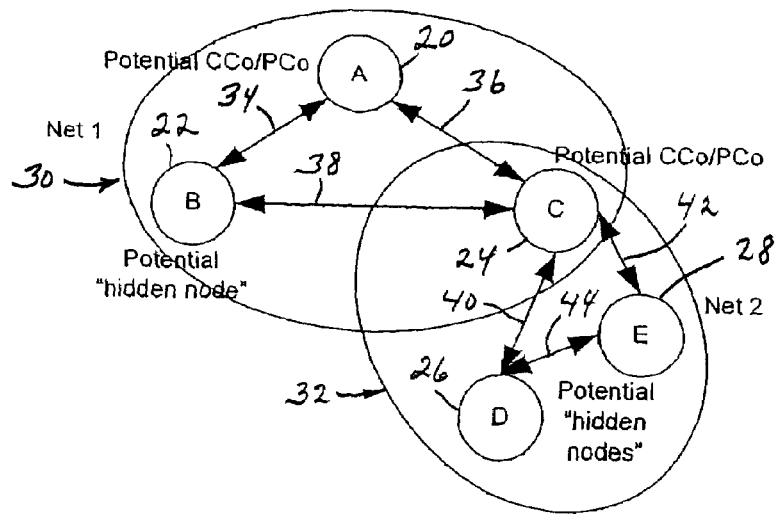
Fig. 1
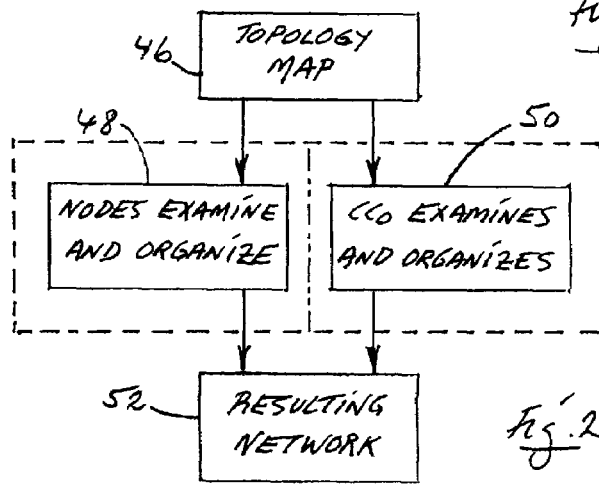
Fig. 2
| Topology Table for Node A | | | | | |
|---|---|---|---|---|---|
| NODES (Device Class optional) | DISCOVERED NODE LISTS -> | | | | |
| A | A | B | C | | |
| B | A | B | C (X) | | |
| C | A | B | C | D | E |
| Topology Table for Node D | | | | | |
| NODES | DISCOVERED NODE LISTS -> | | | | |
| C | A | B | C | D | E |
| D | | | C | D | E |
| E | | | C | D | E |
Fig. 3

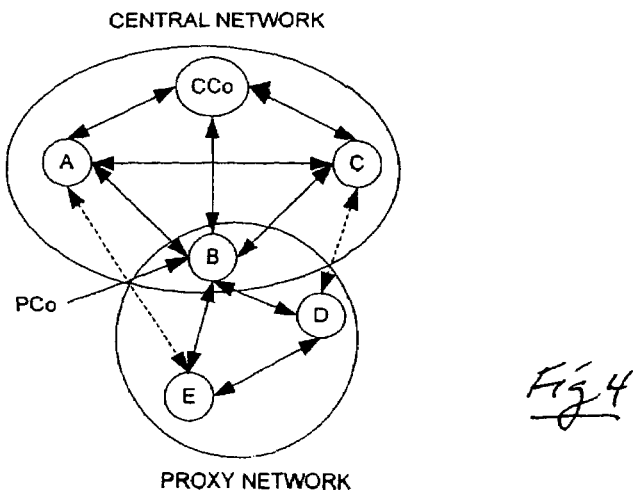

CENTRAL NETWORK

PROXY NETWORK

Fig. 4

| List of Associated DEVs | Discovered DEV Lists |
|---|---|
| MAC ADDRESS(QoSC) | Disc. DEV List of QoSC={MAC ADDRESS(A), MAC ADDRESS(B), MAC ADDRESS(C)} |
| MAC ADDRESS(A) | Disc. DEV List of A={MAC ADDRESS(QoSC), MAC ADDRESS(B), MAC ADDRESS(C), MAC ADDRESS(E)} |
| MAC ADDRESS(B) | Disc. DEV List of B={MAC ADDRESS(QoSC), MAC ADDRESS(A), MAC ADDRESS(C), MAC ADDRESS(D), MAC ADDRESS(E)} |
| MAC ADDRESS(C) | Disc. DEV List of C={MAC ADDRESS(QoSC), MAC ADDRESS(A), MAC ADDRESS(B), MAC ADDRESS(D)} |
| MAC ADDRESS(D) | Disc. DEV List of D={MAC ADDRESS(B), MAC ADDRESS(C), MAC ADDRESS(E)} |
| MAC ADDRESS(E) | Disc. DEV List of E={MAC ADDRESS(A), MAC ADDRESS(B), MAC ADDRESS(D)} |
| | |

Fig. 5

| Order | Criteria | Note |
|---|---|---|
| 1 | Device Class/ Device Capability | DEV may or may not be QoSC capable. Highest class is preferred. |
| 2 | Number of Discovered DEVs in DISCOVERED_NODE_LIST | Higher is preferred |
| 3 | Activity Indicator (Fraction of time DEV is busy) | Lower is preferred |
| 4 | Capacity (Best SNR on Discover Beacons) | Higher is Preferred |
| 5 | Other (vendor defined) | |

Fig. 6

HIERARCHICAL AD HOC NETWORK ORGANIZATIONAL METHOD INVOLVING WITH PROXY NETWORKING

BACKGROUND AND SUMMARY OF THE INVENTION

This invention pertains to a unique ad hoc communication-network self-organizing practice referred to herein as proxy networking, which practice involves, among other things, the identification, establishment (selection), management and control of what are called proxy, or proxy coordinator nodes (PCos). Such nodes, according to the invention, (a) act as intermediaries between a central coordinator node (CCo) and identified hidden nodes (HDEVs) which cannot communicate directly and bidirectionally with the CCo, and also (b) facilitate communication between hidden nodes and other network nodes, all for a purpose of enabling acceptable network participation by hidden nodes.

As will be seen from the discussion presented herein, practice of the various proxy-networking features of the present invention involves, utilizes, and addresses many aspects, both positive and problematic, of hidden node entry into and behavior with a network. Included among these matters are the following:

1. Identifying hidden nodes, per se, through examining network topology information (gathered in any suitable manner);
2. Applying a specifically useful implementable algorithm to analyze such topology information thereby to find an optimal proxy coordinator node (PCo) to aid in managing appropriate network communication involving an identified hidden node;
3. Controlling and managing the allowed entry of a hidden node into and participation in a network, including addressing an appropriate key exchange (security) mechanism, or mechanisms where necessary, in these processes;
4. In relation to this controlling and management activity, preventing any collateral network communication problems from arising due to the presence of a hidden node, the fact of which could affect an entire network;
5. The establishment of a proxy network, per se;
6. Managing the exchange of control messaging between an accepted and entered hidden node and a central coordinator node via a proxy node; an illustration of control messaging (which is also security-related) is messaging including bandwidth request and allocation information; and
7. In the process of selecting the optimal proxy coordinator node, or nodes, doing so (a) in a manner which minimizes the resulting total number of selected proxy nodes, and (b) with the steps of selection being carried out through the activities of a digital processing engine operating on the basis of appropriate relevant control instructions, examples of which are set forth herein in a described, preferred algorithm.

As will become more fully apparent to those skilled in the art, from a study of the disclosure herein of the present invention, implementation of the invention has special utility in a number of readily understandable circumstances. Among these are included (a) a circumstance of initial installation/establishment of network, (b) whenever there is a prospective network change, as by way of a new node, hidden or otherwise, seeking to join the network, and (c) whenever there is some kind of network-functioning discontinuity as, for example, when a new central coordinator node may need to be designated. Other useful circumstances for employment of the invention will certainly come to the minds of those skilled in the art.

All of the invention proxy networking features and considerations set forth above are expressed in more elaborated manners in the detailed description of the invention presented below.

As will be appreciated, the invention is useful in organizing both distributed and centralized communication-networks.

Practice of the invention assumes that there is, in existence, a full-network topology map, or table, which has been created in any suitable manner to provide certain important foundation information about the nodes which are to be appropriately integrated into an established network. Fundamentally, such a map presents nodal information regarding (a) the identities of all nodes intending to participate in a network, (b) the states of existing/possible connectivity between these nodes and the qualities of these connectivities, (c) the identity of ultimately the then most appropriate, selectable CCo (Central Coordinator Node), (d) the identities of so-called hidden nodes (defined below), and (e) the identities of what are referred to herein (later explained) as proxy nodes that serve these hidden nodes. This topology information is necessary if an ad hoc collection of plural nodes is to become self-organized in the most effective manner into a network.

Notwithstanding what has just been said above about a CCo, specific practice of the steps of the invention does not necessarily rely upon the presence or action of a fully pre-established CCo. Proxy networking, according to the invention, may be implemented either by such a CCo armed with topology map knowledge, or in the alternative, by the full collection of nodes per se in a situation where they each are fully armed with independent knowledge of such a map. That this is the case will also become evident to those skilled in the art from a reading of the below detailed description of the invention.

The proxy networking practice of the present invention is described herein in two, different, general network configurations, referred to, on the one hand, as centralized, and on the other, as distributed. In a centralized network, the presence of a CCo is assumed, and such a CCo performs the tasks, based upon knowledge of a full network topology map, of choosing the best-suited PCo(s) to aid communication with hidden nodes. In a distributed network, it is the individual participating nodes which, operating collectively, perform the same functions.

Beyond what has just been stated above, the various features and advantages that are offered by the present invention will become more fully apparent as the detailed description which shortly follows is read in conjunction with the accompanying drawings.

DESCRIPTION OF THE DRAWINGS

FIG. 1 illustrates, in block/schematic form, a plural-node network environment suitable for practice of the present invention.

FIG. 2 is a block/schematic flow diagram which describes the practice of the present invention both in relation to a distributed-type network (the "left-side" portions of this figure), and in relation to a centralized-type network (the "right-side" portions of this figure).

FIG. 3 pictures a representative portion of an organized network topology map on the basis of which the proxy networking practice of the invention is performed. This map portion is specifically related to the collection of plural nodes shown in FIG. 1.

FIG. 4 presents another block/schematic diagram illustrating a plural-node environment which is somewhat different from that pictured in FIG. 1, and with respect to which practice of the present invention is also discussed herein.

FIG. 5 shows a Topology Table associated with FIG. 4.

FIG. 6 illustrates, in relation to FIGS. 4 and 5, priorities in the selection of a CCo.

DETAILED DESCRIPTION OF THE INVENTION

I. Illustration of the Invention in Relation to FIGS. 1, 2 and 3

Turning attention now to the drawings, and beginning with FIG. 1, here five nodes 20, 22, 24, 26, 28, also referred to, respectively, by the letters A, B, C, D, E, are shown organized, for illustration purposes, into two possible networks, or network topologies, 30, 32. Topologies 30, 32 are also referred to herein, respectively, as Net 1 and Net 2. Viable interconnections which relate to these two illustrative organizations are shown at 34 (between A, B), 36 (between A, C), 38 (between B, C), 40 (between C, D), 42 (between C, E), and 44 (between D, E). Possibilities for CCo, for selectable hidden nodes, and for one or more PCo(s) are suggested in this figure.

Looking at these two topologies, or configurations, and recognizing initially that any of the nodes could be the CCo, Net 1 (30) has node A as the illustrative CCo, has nodes B and C as hosts within the network, and has node C as a chosen PCo for the identified hidden nodes D and E. Net 2 (32) has node C as the illustrated CCo, nodes D and E as hosts within the network, and node C as a chosen PCo for identified hidden nodes A and B. A network with only nodes A, B and C as host nodes, and with node A as the CCo, would leave nodes D and E unconnected. Network performance will be significantly different in the two configurations based, among several other factors, on the traffic load handled by nodes chosen as CCos, by the overhead of having a node function as a PCo (separate from a CCo), and if the qualities (capacities) of links between the CCo and the other nodes vary. In Net 2, node C can act both as the CCo and the PCo, and can directly communicate with all four other nodes. In Net 1, node A as the CCo can only communicate directly with two other nodes (B and C), and needs a proxy to handle nodes D and E. As will become apparent, and in the context of proxy networking, the finally selected PCo node(s), and the identities of hidden nodes, are determined from the discovery information placed in an overall network topology map as developed during a suitable topology discover process.

In a distributed-network organizational environment, and as was mentioned earlier, an assumption is made that there is, initially, no CCo. Accordingly, the topology discovery activities (of whatever nature) which take place, and which result, for illustration purposes herein, in the creation of a full network topology map, will result additionally in an overall topology map which becomes known collectively by all (each) of the individual participating nodes. Put another way, these nodes collectively end up possessing full knowledge of the global topology map of the network.

In a centralized-network organizational environment, the mentioned "different" assumption is made, namely, that there is indeed, initially, an operative CCo. In this case, and also for illustration purposes herein, that CCo collects topology-discovery information communicated from each of the individual nodes, and becomes the key repository of a resulting global topology map.

FIG. 3 herein provides an illustration of a portion of a full network topology map of the arrangement pictured in FIG. 1. This map (in its entirety which is not shown) includes a discovered nodes list for each of the nodes in FIG. 1, and also illustrates node-specific topology tables. FIG. 3 illustrates these discovery-discovered pieces of information which are specifically related to the knowledge of and about nodes A and D. Describing what is shown in FIG. 3 with respect, for example, to node A, the topology table for this node consists of its own discovered nodes list (A, B, C) in the first column. Since node A in the illustration now being given is also represented as being a "current" CCo, this node maintains the discovered nodes lists of hidden nodes (D, E) as well. The rows in FIG. 3 correspond to the discovered node lists received from each of the participating nodes. For example, the discovered nodes list of node A is (A, B, C). That of node C is (A, B, C, D, E). That of node E is (C, D, E), and soon.

The partial map of FIG. 3 has been constructed further to illustrate that it may be possible that node B can hear node C, but that node C might not be able to hear node B. This implies that the link between nodes B and C is not operational in both directions (i.e., is non-bi-directional) and hence is not a valid link. This condition is illustrated by (X) in the discovered nodes list from node B in node A's topology table. Node B does show up in node C's list.

With attention now directed for a moment to FIG. 2, this figure; in four blocks 46, 48, 50, 52, gives a high-level view of the practice of the invention. In a distributed network situation, proxy networking activity-flow follows the sequence of block 46, block 48, block 52. All participating nodes perform an analysis (block 48) of the information contained in the full network topology map (46), and in a manner shortly to be detailed, make appropriate hidden node and associated PCo (s) choices.

In a centralized-network situation activity-flow progresses in the sequence of block 46, block 50, block 52. The then "current" and present CCo performs an analysis (block 50) of the information contained in the full network topology map (46), and itself then performs the tasks of choosing hidden node and associated PCo(s).

Following now in this text, under several appropriate section headings, are detailed descriptions of the following activities: Topology Map Analysis; Non-Bidirectional Link Detection; Organization of Network; Identification of Hidden Nodes; and Selection of Proxy Nodes.

Topology Map Analysis

Considering now the process of topology table analysis, let $D_A$ represent the discovered nodes list for node A, i.e. the set consisting of the identities of all nodes that node A has heard.

The topology table for Node A is then defined as a tabulation of the discovered nodes lists for all the nodes in $D_A$, i.e., $$T_A = \{D_i\} \forall i \in D_A$$

Non-Bidirectional Link Detection

Consider two nodes, i and j. If a node i has been discovered by node j, i.e., if the identity of i is an entry in the discovered nodes list of node j, but node j has not been discovered by node i, i.e., there is no entry for node j in the discovered nodes list of i, then the link between i and j is said to be non-bidirectional.

For any two nodes, i and k, if i, $k \in D_i \cap D_k$ then i and k have a bidirectional link, $i \Leftrightarrow k$ Organization of Network A network can be defined as the largest collection of nodes from a group of nodes that participate in the topology discovery and network organization processes, where every node in the collection can hear every other node and be heard by every node in the collection. This implies that all nodes in a network have bi-directional links to each other. Define:

$N \equiv \{i\}$, where i represents node IDs and $\forall i, j \in N, i <=> j$ and
$|N| \geqq \{\text{Any Collection of nodes } \{j\} \text{ where } \forall i, j \in N, i <=> j\}$ The second condition present in the mathematical expression appearing immediately above is optional. One may thus define a network simply as any collection of nodes wherein the nodes are connected to each other bi-directionally. The node can determine the network N based on the above definition by examining the topology map and determining the set of nodes which have the properties defined in this expression.

Identification of Hidden Nodes

Once the topology map has been analyzed to define the network N, all of those nodes in the overall topology table of the best potential CCo candidate, or with respect to a currently selected CCo, that do not belong to N are declared to be "hidden nodes," i.e.

If node $k \not\in N$ then "k is a hidden node".

Selection of Proxy Nodes

The node represents the best candidate to become CCo in a distributed network situation, or a node that has already been chosen, at least preliminarily, to be the CCo in the case of a centralized network, examines its topology table to determine if there are other nodes that can best communicate with the hidden nodes also identified by examination of that same table. If there exists a node, say j, that belongs to the network N, and has a bidirectional link to the hidden node, say k, that does not belong to N, then that node may be designated a Proxy Coordinator or PCo i.e., $j \in N$, $k \not\in N$, $j <=> k$, then j is a potential PCo.

In order to determine the PCos such that all possible hidden nodes are covered by a single PCo and not multiple PCos, the following algorithm is implemented.

1. Let $S_{PCo}$ represent the set of Proxy Coordinator nodes.
2. For each node $k \in D_i$ for some $D_i \in T_{CCo}$, and $k \not\in N$, if there exists a node $j \in N$, and $j \in S_{PCo}$, and $j <=> k$, then j is the PCo for node k.
3. For each node $k \in D_i$ for some $D_i \in T_{CCo}$, and $k \not\in N$, if there exists a node $j \in N$, and $j \not\in S_{PCo}$, and $j <=> k$, then j is designated the PCo for node k and added to the set of PCos, $S_{PCo}$.
4. For each node $k \in D_i$ for some $D_i \in T_{CCo}$, and $k \not\in N$, if there DOES NOT exist a node $j \in N$, and $j <=> k$, then the hidden node k cannot be reached by any node in the network N and therefore has no PCo.

II. Further Illustration of the Invention—With Respect Especially to FIG. 4

FIG. 4 provides an opportunity for an additional, and somewhat more elaborated, discussion regarding practice of the present invention, and of ancillary considerations which help to highlight the features and versatility of the invention.

Nodes pictured in FIG. 4 are alphabetically labeled only, and references to letters of the alphabet in this descriptive section of this specification relate to only to FIG. 4. The text of the narrative in this section of this specification, which is somewhat different in style from that used in other parts, is drawn substantially directly from descriptive material which I have written in previously unpublished text designed to set forth the various aspects of my invention.

Proxy Networking

A proxy network is always ultimately associated with an existing instantiation of a network with its own CCo. This "parent network" is referred to as the Central Network or CN hereafter. The CN is a logical association of DEVs (i.e., devices, nodes, etc.) all of which are authenticated and authorized to communicate with each other under the aegis of a controlling entity called the CCo. Before such a logical association of DEVs is instantiated, the DEVs must ascertain if another network exists in its neighborhood and if the DEVs can join the existing network. The Beacon transmitted by the CCo is called the Central Beacon. Every DEV in the CN must be able to communicate with the CCo. All the DEVs in a CN are free to communicate with each other, provided the power line channel characteristics between any two communicating DEVs permits it.

The CCo must coordinate sharing of the bandwidth with Neighbor Networks. Besides this, all other operations of the DEVs in the CN and the CCo are independent.

A "Hidden Device" (HDEV) is a DEV that cannot communicate directly with the CCo of a CN but is authorized to communicate with the CCo through a Proxy DEV called the Proxy Coordinator (PCo). A Proxy DEV is defined as a DEV that conveys a message from an HDEV to the CCo. An HDEV cannot hear the Central Beacon but can hear a Proxy Beacon, and uses information from the proxy Beacon to communicate with the Proxy DEV. A Proxy Network (PN) may be established at the discretion of the CCo when an HDEV communicates with the CCo via a Proxy DEV in the CN. The Proxy DEV may or may not be appointed as the PCo by the CCo. The PCo and all HDEVs served by the PCo together form the PN. A CN may support multiple PNs by appointing PCos to serve one or more HDEVs.

The PCo only functions as a relay for communications between the CCo and the HDEVs in a particular network. The PCo must transmit a Proxy Beacon over a BePCh designated by the CCo. All HDEVs in a PN must be able to receive the Proxy Beacon. All operations of the HDEVs are controlled by the CCo with the PCo serving as a relay. An HDEV may communicate with any other DEV in the CN once the HDEV is associated and authenticated by the CCo via the PCo.

Identification of HDEVS

The establishment of a PN is preceded by the presence of HDEVs that communicate with the CCo with an association request via a Proxy DEV (PDEV). The method by which the CCo receives the association request message from the HDEV is described below. The accurate decryption and interpretation of the association request message from the HDEV informs the CCo of the presence of an HDEV in the network.

Because the discovery process (described later) is ongoing, it is possible that HDEVs may come to the CCo's notice via the Topology Table before they are actually associated. Any DEV which does not appear in the Discovered Node List of the CCo is an HDEV since an acceptable communications link between the CCo and the HDEV does not exist.

Association of a Hidden DEV—To be Referred to Collectively as AHD.

The process by which an HDEV attempts to join a network initially is called association and is referred to herein as AHD. This association practice is very similar to the association process of a "regular" DEV. The HDEV still transmits the same association message. The only difference is that the message is encapsulated by a Proxy DEV (PDEV) and relayed to the CCo.

(a) The association process for HDEVs with the CCo differs from that for ordinary DEVs. The association process for HDEVs summarized below in the following "AHD" steps:

(AHD-1) Every DEV that begins operations attempts to detect Beacon transmissions. If the only Beacon received by the DEV is a Discover Beacon (related to topology discovery), then the DEV (now called an HDEV) identifies the contention period (CP) locations in subsequent Frames, after acquiring Frame synchronization;

(AHD-2) The HDEV must communicate with the Proxy DEV (the DEV that transmitted the Proxy Beacon) assuming that this PDEV is going to be its PCo. The HDEV communicates an association request message to the PDEV over the CP. The HDEV encrypts its association request MEntry (MAC management information elements) with its DEK (Device Encryption Key);

(AHD-3) The PDEV cannot decrypt the encrypted association request from the HDEV as the PDEV does not possess the DEK for the new HDEV. However, the PDEV can interpret the ID value of the received MAC message since the header is unencrypted. If the ID value is some pre-specified value, then the PDEV knows that this MAC message contains a Control message or MEntry from a DEV that has yet to associate with the network;

(AHD-4) The PDEV encapsulates the association request MEntry (encrypted by the DEK) in a new RELAY_REQ MEntry. This MEntry is again encrypted by the PDEV using the NEK in a MAC message and forwarded to the CCo, with ID field in the MAC message set to the PDEV's MAC address;

(AHD-5) The CCo examines the ID field of the UMAC message and then decrypts the payload MEntry using, first, the NEK. This produces the RELAY_REQ message sent by the PDEV. The CCo then decrypts the encapsulated associate request message from the HDEV using the DEK of the HDEV;

(ADH-6) If the CCo accepts the association request, the CCo must first establish a Proxy Network as described a later section herein;

(AHD-7) The CCo then encrypts the association response with the DEK, encapsulates this MEntry in a RELAY_REQ message, encrypts this message with the NEK and sends the resulting MAC message to the new PCo; and (AHD-8) The PCo decrypts the UMAC message payload using the NEK and recognizes the RELAY_REQ MEntry. The PCo then forwards the encrypted association response MEntry to the HDEV without decrypting it (because PCo does not have the HDEV key).

(b) This process informs the CCo of the existence of an HDEV in the network, and enables the CCo to communicate with the HDEV and complete the association process via the PDEV and the PCo. The entire process is encrypted using the DEK of the HDEV and the NEK. Once the HDEV is associated with the CN, all future transmissions from the HDEV must use the NEK for encryption. The procedure is described in detailed "FT" steps set forth below:

(FT-1) If the HDEV is able to decode Discover Beacons from a PDEV, or Proxy Beacons from a Proxy Coordinator (PCo), the HDEV generates the ASSOC_REQ primitive;

(FT-2) The HDEV will send the BM_ASSOC_REQ message to the PDEV or PCo. This message is encrypted with the DEV's own Device Encryption Key (DEK), and is sent over the contention access period as indicated in the Discover Beacon or Proxy Beacon. The message must indicate that it is from a DEV which is not associated with the network;

(FT-3) When the PDEV or PCo receives the message, it identifies the message as being from a new device and, it will simply relay the ASSOC_REQ message to the CCo using the RELAY_REQ message. The RELAY_REQ message is must indicate that the payload is from a DEV that is not associated with the network. The RELAY_REQ message is encrypted with the NEK;

(FT-4) The CCo will decrypt the RELAY_REQ message using the NEK, and extract the ASSOC_REQ message inside. Since the RELAY_REQ message indicates that the payload is from a new DEV, the CCo will decrypt the ASSOC_REQ message using its list of available DEKs;

(FT-5) The CCo will generate a ASSOC_RSP message. The message is encrypted with the same DEK, and encapsulated inside a RELAY_REQ message. The message field indicates that the message is in response to a new DEV joining the network. The RELAY_REQ message is encrypted with the NEK, and is sent to the PDEV or PCo;

(FT-6) When the PDEV or PCo receives the RELAY_REQ message, it will decrypt it using the NEK, and extract the ASSOC_RSP message. The PDEV or PCo will not attempt to decrypt the BASSOC_RSP message. Instead, the ASSOC_RSP message is broadcast by the PDEV or PCo;

(FT-7) When the HDEV receives a broadcast ASSOC_RSP message, it will decrypt the message using its DEK and see if the MAC address matches. The ASSOC_RSP message contains the outcome of the association attempt, the NEK, and the device identifiers assigned, if any;

(FT-8) In addition, if the HDEV is accepted into the network, the CCo will send the PROXYAPPOINT_REQ message to the PDEV or PCo it wishes to be responsible for the HDEV. This message requests the PDEV or PCo to start transmitting Proxy Beacons, and specifies the identity (MAC address or MAC ADDRESS) of the HDEV; and (FT-9) When the PCo receives this message, it will update its HDEV database with the new information. (When a PDEV receives the message, it becomes a PCo).

Exchange of Messages Between a Hidden Device and the CCo

The exchange of messages between a HDEV and the CCo is described in this Section. The HDEV has associated with the network through a PCo and is assigned a MAC ADDRESS and an ID (MID) for control messages. All messages are encrypted with the Network Encryption Key (NEK).

Whenever the HDEV has a control message to send to the CCo, it will send the message to its PCo, setting the ID field of the message to its MID. The PCo will decrypt the message and interpret the MAC Management Message or MEntry. If the message identifies that the HDEV's message is destined for the CCo, the PCo will encapsulate the HDEV's message inside a RELAY_REQ message, encrypt the entire message and send it to the CCo. A field in the RELAY_REQ message identifies the HDEV involved.

If a response is required, the CCo will encapsulate the response message inside a RELAY_REQ message, encrypt the entire message with the NEK and send it to the PCo responsible for the particular HDEV. A field in the RELAY_REQ message is used to identify the HDEV. After the PCo decrypts the RELAY_REQ message, it will extract the CCo's response message, and encrypt it with the NEK and forward it to the HDEV.

Establishment of a Proxy Network—EPN

The following description through and including the content of subparagraph (EPN-3) under the above heading is referred to herein collectively as EPN. If an HDEV is discovered upon receipt of a relay transmission of an association request from a PDEV, the CCo may establish a PN by appointing the PDEV that relayed the MEntry to be the PCo for that HDEV. Alternatively, the CCo may choose another DEV to perform the function of PCo and assign the HDEV to the PN controlled by that PCo. The DEV appointed as the PCo then communicates with the HDEV and identifies itself as the PCo.

The CCo may also choose to create a PN or reassign HDEVs from one PN to another PN. The CCo should attempt to minimize the number of PNs that it creates. This may require it to reconfigure PNs (e.g., combine two or more PNs into a single PN) as the discovery process progresses.

A PN is established when (and in accordance with the following "EPN" steps):

(EPN-1) The CCo is informed of the presence of HDEVs through relays from PDEVs or is aware of HDEVs from the Topology Table;

(EPN-2) The CCo informs the PDEV (or another DEV in the CN) of its appointment as the PCo (using the PROXYAPPOINT_REQ message) and establishes a dedicated BW allocation in the Contention Free Period (CFP) for the transmission of a periodic Proxy Beacon by the PCo. The CCo may also establish dedicated BW allocations for carrying control information from the HDEVs to the PCo and from the PCo to the CCo. The PDEV must confirm its acceptance of the PCo function; and (EPN-3) The PCo informs all HDEVs in its PN of its identity (using the PH_PROXYAPPOINT_IND message, and begins transmitting the Proxy Beacon.

PCo Selection

Multiple DEVs in a CN may be suitable to perform the role of the PCo. The CCo may choose any of the DEVs to be the PCo, subject to the recommendation that it should minimize the number of PNs that it forms. The method for choosing the PCo is implementation dependent.

Functions of Proxy Coordinator

The PCo performs the following functions.

(a) Establishment of the PN

The PCo must inform all HDEVs associated with it of the formation of the PN and its identity as PCo. The PCo must also inform the HDEVS of the time of transmission of the first Proxy Beacon. This is accomplished by transmitting the PROXYAPPOINT_IND message.

(b) Transmission of Proxy Beacon

The PCo must construct the Proxy Beacon every Frame based on the main Beacon received by the PCo at the beginning of the Frame. The PCo must only change the following fields in the main or Central Beacon to construct the Proxy Beacon:

(1) Set Beacon Source MAC Address to the PCo MAC address (2) Insert the Network ID field which is the MAC address of the CCo.

All other fields must remain the same in both Beacons. The MEntries in the Central Beacon that are not destined for HDEVs in the PN may or may not be repeated in the Proxy Beacon.

(c) Relay Communications between HDEV and CCo

HDEVs communicate all MEntries that are destined to the CCo, to the PCo on the DCLCh, by substituting the CCo Destination MAC Address (DA) with the DA of the PCo. HDEVs MUST not encapsulate their MEntries. For all purposes, the HDEV treats the PCo as its CCo. The HDEV must use the Network Encryption Key (NEK) to encrypt all the MEntries except the association request which is encrypted by the HDEV's Device Encryption Key (DEK).

When a PCo receives a message from the HDEV encrypted in the NEK, the PCo is able to decrypt the message and interpret the MEntry. When the PCo receives a message from an HDEV that is intended for the CCo, the routing function in the MAC of the PCo forwards the MEntry to the PCo function within the PCo, based on the type of the received MEntry. The type clearly identifies those MEntries that are destined for the CCo. The PCo shall relay all such MEntries to the CCo by encapsulating them in another MEntry, RELAY_REQ. The PCo shall identify the HDEV MAC address from which the control message was received in the relay MEntry.

In the case of association requests from new HDEVs, since the MEntry is encrypted using the HDEV key, the PCo is unable to interpret the type of the message. In this case only does the PCo uses the indication that the message is from an un-associated device and determines that the message is destined to the CCo. The PCo must then encapsulate the encrypted association request in a RELAY_REQ MEntry and forward it to the CCo.

The CCo must also encapsulate all messages destined to HDEVs within a RELAY_REQ MEntry. The PCo must remove this encapsulation and forward the original MEntry to the destination HDEV identified in the relay MEntry. Note that all MEntries are contained within a MAC frame. The headers of the MAC frame are not encrypted; only the payload is encrypted using the NEK by both the CCo and the PCo.

Functions of Hidden Device

The HDEV performs all the same functions defined for an ordinary DEV, except the association function performed when the HDEV first joins the network. The only difference is that all network control communications between the HDEV and CCo must pass through a PDEV or PCo and hence the HDEV must substitute the PDEV or PCo's MAC ADDRESS wherever the address of the CCo is required.

The HDEVS must participate in global network functions such as Discovery. HDEVs may communicate directly with other DEVs in the CN where possible. The CCo may establish CFP allocations between a DEV in the CN and an HDEV in a PN.

Thus from the illustrations described above, those skilled in the art will appreciate that the novel approach of employing discovered and available network topology map information to identify hidden nodes, and to select for these hidden nodes CCo communication surrogates in the forms of PCos, leads to a highly unique and efficient manner of promoting self-organization of an ad-hoc, distributed or centralized, plural-node, communication network.

While a preferred approach to practicing the invention has been illustrated and described herein, I recognize that variations and modifications are possible which come within the spirit of the invention.

I claim:

1. In an ad hoc hierarchical network organizational method involving a network N, a proxy-networking practice including the establishing of a proxy coordinator node (PCo) by implementing the following algorithm which is designed to have, as a purpose, the minimizing of the number of proxy nodes needed to serve hidden nodes:

1. Let $S_{PCo}$ represent the set of Proxy Coordinator nodes;
2. For each node $k \in D_i$ for some $D_i \in T_{CCo}$, and $k \notin N$, if there exists a node $j \in N$, and $j \in S_{PCo}$, and $j <=> k$, then j is the PCo for node k;
3. For each node $k \in D_i$ for some $D_i \in T_{CCo}$, and $k \notin N$, if there exists a node $j \in N$, and $j \notin S_{PCo}$, and $j <=> k$, then j is designated the PCo for node k and added to the set of PCos, $S_{PCo}$;
4. For each node $k \in D_i$ for some $D_i \in T_{CCo}$, and $k \notin N$, if there DOES NOT exist a node $j \in N$, and $j <=> k$, then the hidden node k cannot be reached by any node in the network N and therefore has no PCo.

* * * * *

UNITED STATES PATENT AND TRADEMARK OFFICE
CERTIFICATE OF CORRECTION

PATENT NO. : 7,506,042 B2  Page 1 of 1
APPLICATION NO. : 10/913657
DATED : March 17, 2009
INVENTOR(S) : Deepak V. Ayyagari It is certified that error appears in the above-identified patent and that said Letters Patent is hereby corrected as shown below:

ON THE TITLE OF THE PATENT:
Item (54):
Please correct the title of the invention to read --HIERARCHICHAL AD HOC NETWORK ORGANIZATIONAL METHOD INVOLVING PROXY NETWORKING--.

Column 1, lines 1-3, inclusive:
Please correct the title of the invention to read --HIERARCHICHAL AD HOC NETWORK ORGANIZATIONAL METHOD INVOLVING PROXY NETWORKING--.

Signed and Sealed this

Ninth Day of June, 2009

JOHN DOLL
*Acting Director of the United States Patent and Trademark Office*